(12) United States Patent
Chae et al.

(10) Patent No.: US 10,919,286 B2
(45) Date of Patent: Feb. 16, 2021

(54) POWDER BED FUSION SYSTEM WITH POINT AND AREA SCANNING LASER BEAMS

(71) Applicant: GM GLOBAL TECHNOLOGY OPERATIONS LLC, Detroit, MI (US)

(72) Inventors: HyungMin Chae, Novi, MI (US); John P. Spicer, Plymouth, MI (US); Mark A. Smith, Huntington Woods, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 853 days.

(21) Appl. No.: 15/405,367

(22) Filed: Jan. 13, 2017

(65) Prior Publication Data

US 2018/0200835 A1 Jul. 19, 2018

(51) Int. Cl.
*B23K 26/342* (2014.01)
*B23K 26/082* (2014.01)
*B23K 37/047* (2006.01)
*B29C 67/00* (2017.01)
*B33Y 10/00* (2015.01)
*B33Y 30/00* (2015.01)
*B29C 64/153* (2017.01)
*B29C 64/25* (2017.01)
*B29C 64/268* (2017.01)
*B29C 64/255* (2017.01)

(Continued)

(52) U.S. Cl.
CPC ............ *B33Y 30/00* (2014.12); *B29C 64/153* (2017.08); *B29C 64/25* (2017.08); *B29C 64/255* (2017.08); *B29C 64/268* (2017.08); *B33Y 10/00* (2014.12); *B22F 3/1055* (2013.01); *B22F 2003/1056* (2013.01); *B29K 2105/251* (2013.01); *Y02P 10/25* (2015.11)

(58) Field of Classification Search
CPC ....... B33Y 30/00; B33Y 10/00; B29C 64/153; B29C 64/255; B29C 64/25; B29C 64/268; B29K 2105/251; Y02P 10/295; B22F 2003/1056; B22F 3/1055
USPC ...................................................... 219/76.1
See application file for complete search history.

(56) References Cited

U.S. PATENT DOCUMENTS 3,608,001 A * 9/1971 Kowalski .................. C08F 8/50
264/40.6
3,791,341 A * 2/1974 Diamond .............. B05B 7/1445
118/677

(Continued)

FOREIGN PATENT DOCUMENTS

CN 102699531 A 10/2012
CN 104759623 A 7/2015

(Continued)

*Primary Examiner* — Eric S Stapleton
(74) *Attorney, Agent, or Firm* — Quinn IP Law

(57) ABSTRACT

A powder bed fusion system includes a plurality of individual build chambers, with each individual build chamber including an area laser scanner optical device and a point laser scanner. A single, area beam delivery system and the plurality of build chambers are moveable relative to each other, such that the area beam delivery system may be positioned to provide an area scanning laser beam to any of the area laser scanner optical devices in any of the plurality of build chambers. The point laser scanners may be used to contour an edge of an object, and the area scanning laser beam may be used to fill in large areas of the object.

18 Claims, 2 Drawing Sheets

(51) Int. Cl.
  *B29K 105/00* (2006.01)
  *B22F 3/105* (2006.01)

(56) References Cited

U.S. PATENT DOCUMENTS

| | | | | |
|---|---|---|---|---|
| 3,801,869 A * | 4/1974 | Masuda | ............... | B05B 5/088 361/227 |
| 4,247,508 A * | 1/1981 | Housholder | ....... | G05B 19/4099 264/122 |
| 4,615,648 A * | 10/1986 | Merz | ................... | B65G 53/521 406/95 |
| 4,863,538 A * | 9/1989 | Deckard | ............... | B33Y 10/00 264/497 |
| 4,944,817 A * | 7/1990 | Bourell | ................ | B33Y 10/00 264/497 |
| 5,132,143 A * | 7/1992 | Deckard | ............... | C23C 24/10 264/497 |
| 5,236,637 A * | 8/1993 | Hull | ........................ | B29C 35/08 264/401 |
| 5,304,329 A * | 4/1994 | Dickens, Jr. | ......... | B29C 64/153 264/497 |
| 5,342,919 A * | 8/1994 | Dickens, Jr. | ......... | B29C 41/003 528/323 |
| 5,527,877 A * | 6/1996 | Dickens, Jr. | ......... | B29C 41/003 528/323 |
| 5,647,931 A * | 7/1997 | Retallick | ................ | B22F 3/004 156/273.3 |
| 5,648,450 A * | 7/1997 | Dickens, Jr. | ......... | B29C 41/003 528/323 |
| 5,733,497 A * | 3/1998 | McAlea | ................ | B29C 39/003 264/497 |
| 5,814,255 A * | 9/1998 | Weiser | ................... | B28B 1/522 264/70 |
| 5,817,206 A * | 10/1998 | McAlea | ................ | C08J 3/122 156/272.8 |
| 5,902,441 A * | 5/1999 | Bredt | ....................... | B28B 1/00 156/284 |
| 5,902,537 A * | 5/1999 | Almquist | ............... | B29C 41/12 264/401 |
| 5,990,268 A * | 11/1999 | Dickens, Jr. | ......... | B29C 41/003 528/323 |
| 6,036,777 A * | 3/2000 | Sachs | ...................... | B05C 19/04 118/56 |
| 6,054,192 A * | 4/2000 | Otsuka | .................... | B29C 41/36 156/272.8 |
| 6,238,614 B1 * | 5/2001 | Yang | ........................ | B33Y 10/00 264/497 |
| 6,336,480 B2 * | 1/2002 | Gaylo | ...................... | B22F 3/004 141/12 |
| 6,375,874 B1 * | 4/2002 | Russell | .................. | B29C 41/12 264/28 |
| 6,792,326 B1 * | 9/2004 | Duignan | ................ | B23K 26/04 700/119 |
| 6,814,926 B2 * | 11/2004 | Geving | ................... | B33Y 70/00 419/10 |
| 6,815,636 B2 * | 11/2004 | Chung | .................. | G05D 23/1919 219/121.65 |
| 6,930,278 B1 * | 8/2005 | Chung | .................. | B23K 26/34 219/121.85 |
| 6,989,115 B2 * | 1/2006 | Russell | .................. | B29C 41/12 264/39 |
| 7,088,432 B2 * | 8/2006 | Zhang | .................. | G03F 7/0037 355/77 |
| 7,357,629 B2 * | 4/2008 | Weiskopf | ............... | B33Y 10/00 425/188 |
| 7,521,652 B2 * | 4/2009 | Chung | .................. | B22F 3/1028 219/121.84 |
| 7,569,273 B2 * | 8/2009 | Bredt | .................... | C08L 101/00 428/402 |
| 7,790,096 B2 * | 9/2010 | Merot | .................. | B29B 13/021 264/497 |
| 8,137,609 B2 * | 3/2012 | McAlea | .................. | B29C 35/16 264/497 |
| 9,156,056 B2 * | 10/2015 | Abe | ...................... | B22F 3/1055 |
| 9,308,583 B2 * | 4/2016 | El-Dasher | ............ | B22F 3/1055 |
| 9,421,715 B2 * | 8/2016 | Hartmann | ............... | B28B 1/001 |
| 9,821,543 B1 * | 11/2017 | Crear | ..................... | B33Y 40/00 |
| 9,931,785 B2 * | 4/2018 | Cullen | .................... | B33Y 10/00 |
| 9,969,930 B2 * | 5/2018 | Florio | ..................... | C09K 8/80 |
| 10,099,426 B2 * | 10/2018 | Ederer | ..................... | B29C 64/35 |
| 10,207,489 B2 * | 2/2019 | Dave | ..................... | G01N 21/00 |
| 2001/0045678 A1 * | 11/2001 | Kubo | .................... | B29C 41/36 264/37.29 |
| 2002/0105114 A1 * | 8/2002 | Kubo | .................... | B29C 64/153 264/497 |
| 2002/0152002 A1 * | 10/2002 | Lindemann | ........... | B22F 3/1055 700/119 |
| 2004/0021256 A1 * | 2/2004 | DeGrange | ............. | B29C 41/46 264/497 |
| 2004/0025905 A1 * | 2/2004 | Ederer | ..................... | B22C 7/00 134/6 |
| 2005/0083498 A1 * | 4/2005 | Jeng | ...................... | G03F 7/0035 355/53 |
| 2005/0087906 A1 * | 4/2005 | Caretta | ..................... | B29B 7/88 264/211 |
| 2005/0263932 A1 | 12/2005 | Heugel | | |
| 2006/0219671 A1 * | 10/2006 | Merot | .................. | B29B 13/021 219/121.6 |
| 2009/0020901 A1 * | 1/2009 | Schillen | .................. | B29C 70/88 264/31 |
| 2009/0169664 A1 * | 7/2009 | Cox | ........................ | B01F 3/188 425/174.4 |
| 2009/0206065 A1 * | 8/2009 | Kruth | .................... | B22F 3/1055 219/121.66 |
| 2011/0090477 A1 * | 4/2011 | Haga | ...................... | G03F 7/70191 355/67 |
| 2014/0265047 A1 * | 9/2014 | Burris | .................... | B23K 26/034 264/497 |
| 2016/0059310 A1 | 3/2016 | Junker et al. | | |
| 2017/0106593 A1 * | 4/2017 | Khairallah | ............ | B29C 64/273 |

FOREIGN PATENT DOCUMENTS

DE  10235427 A1  2/2004
WO  WO2010045951 A1  4/2010

* cited by examiner

POWDER BED FUSION SYSTEM WITH POINT AND AREA SCANNING LASER BEAMS

INTRODUCTION

The disclosure generally relates to powder bed fusion system, and a method of operating the powder bed fusion system.

Powder bed fusion is a class of additive manufacturing processes, in which thin layers of material are formed on top of each other to define a three dimensional shape. Powder bed fusion processes may include, but are not limited to, direct metal laser sintering (DMLS), electron beam melting (EBM), selective heat sintering (SHS), selective laser melting (SLM), and selective laser sintering (SLS).

Some powder bed fusion processes use a laser to melt and fuse powdered material together. A thin layer of the powdered material is spread over a powder bed, and the laser is directed onto the powdered material to melt the powdered material where the laser is applied. The melted material solidifies, thereby forming a thin cross sectional layer of a product. Another layer of the powdered material is spread over the previously formed layer, and the laser is directed onto the powdered material to melt the powdered material and fuse it with the underlying layer where the laser is applied. The melted material solidifies, thereby forming a slightly thicker cross sectional layer of the product. The process is repeated until the entire three dimensional product is formed.

SUMMARY

A powder bed fusion system is provided. The powder bed fusion system includes a plurality of individual build chambers, and a plurality of area laser scanner optical devices. One of the plurality of area laser scanner optical devices is dedicated to only one of the plurality of build chambers. An area laser beam generator is operable to generate an area scanning laser beam. The powder bed fusion system further includes an area beam delivery system that is operatively connected to the area laser beam generator. The area beam delivery system receives the area scanning laser beam from the area laser beam generator. The area beam delivery system directs the area scanning laser beam to one of the plurality of area laser scanner optical devices. The area beam delivery system and the plurality of individual build chambers are moveable relative to each other, so that the area beam delivery system may direct the area scanning laser beam to any of the plurality of area laser scanner optical devices in any of the plurality of build chambers.

In one embodiment, the plurality of build chambers are arranged in a linear array, with the area beam delivery system and the linear array of the plurality of build chambers moveable relative to each other along a linear path. The area beam delivery system may be moveable relative to the linear array of the plurality of build chambers.

In one aspect of the disclosure, a track system may moveably support the area beam delivery system. A drive system may interconnect the track system and the area beam delivery system. The drive system is operable to move the area beam delivery system along the linear path relative to the track system.

In another embodiment, the plurality of build chambers are arranged in an annular array having an approximate center. The laser beam generator is disposed at the approximate center of the annular array of the plurality of build chambers. The annular array of the plurality of build chambers and the area beam delivery system are rotatable relative to each other about an axis. The area beam delivery system may be rotatable about the axis relative to the annular array of the plurality of build chambers.

In one aspect of the disclosure, a turntable may support the area beam delivery system. A drive system may be connected to the turntable. The drive system is operable to rotate the turntable about the axis relative to the annular array of the plurality of build chambers.

In one aspect of the disclosure, each of the plurality of area laser scanner optical devices focuses the area scanning laser beam onto a first area equal to or larger than $4.0\ mm^2$.

In another aspect of the disclosure, the area beam delivery system may include a pattern control system that is operable to form a pattern in the area scanning laser beam. The pattern may include at least one heated area that is heated to a first temperature, and at least one second temperature area. The second temperature area may be heated to a second temperature that is different from the first temperature, or may not be heated, i.e., an un-heated area.

In another aspect of the disclosure, the powder bed fusion system may further include a plurality of point laser scanners. One of the plurality of point laser scanners is dedicated to only one of the plurality of build chambers. Each of the plurality of point laser scanners focuses a respective point scanning laser beam on a second area. The second area is equal to or less than $0.8\ mm^2$. In one aspect of the disclosure, each of the plurality of point laser scanners includes a respective point laser generator and a respective point laser optical device.

In another aspect of the disclosure, each of the plurality of build chambers includes a respective powder supply, a respective powder spreader, and a respective powder bed.

A method of operating a powder bed fusion system is also provided. The method includes selecting one of a plurality of individual build chambers as a first active build chamber. A powder is spread over a powder bed in the first active build chamber. A point laser scanner, which is dedicated to the first active build chamber, is activated to direct a point scanning laser beam onto the powder in the powder bed. The point scanning laser beam is moved relative to the powder bed to melt the powder in the powder bed along a path defining an exterior edge of a closed shape of a product. An area beam delivery system is moved into a position adjacent the first active build chamber, such that the area beam delivery system is positioned to direct an area scanning laser beam to an area laser scanner optical device that is dedicated to the first active build chamber. An area laser beam generator is activated to generate the area scanning laser beam and direct the area scanning laser beam to the area beam delivery system. The area beam delivery system directs the area scanning laser beam to the area laser scanner optical device of the first active build chamber. The area laser scanner optical device directs the area scanning laser beam onto the powder in the powder bed to melt the powder within the exterior edge of the closed shape to fill in an interior of the closed shape and define a first cross sectional layer of the product. The sequencing of the point scanning laser beam and the area scanning laser beam may vary. The point scanning laser may be used first to define the exterior edge of the closed shape, followed by the area scanning laser beam to fill in an interior of the closed shape. Alternatively, the area scanning laser may be used to fill in the interior of the closed shape first, followed by the point scanning laser to define the exterior edge of the closed shape.

In one aspect of the disclosure, the method of operating the powder bed fusion system includes providing the powder bed fusion system to include the plurality of individual build chambers. The powder bed fusion system includes plurality of point laser scanners, with one of the plurality of point laser scanners dedicated to only one of the plurality of build chambers. Each of the plurality of point laser scanners focuses a respective point scanning laser beam at a second area, which is equal to or less than 0.8 mm². The powder bed fusion system further includes a plurality of area laser scanner optical devices, with one of the plurality of area laser scanner optical devices dedicated to only one of the plurality of build chambers. Each of the plurality of area laser scanner optical devices focuses the area scanning laser beam from the area beam delivery system onto a first area, which is equal to or larger than 4.0 mm². The powder bed fusion system includes an area laser beam generator that is operable to generate an area scanning laser beam. An area beam delivery system is operatively connected to the area laser beam generator for receiving the area scanning laser beam from the area laser beam generator. The area beam delivery system directs the area scanning laser beam to one of the plurality of area laser scanner optical devices. The area beam delivery system and the plurality of individual build chambers are moveable relative to each other, so that the area beam delivery system may direct the area scanning laser beam to any of the plurality of area laser scanner optical devices in any of the plurality of build chambers.

In another aspect of the disclosure, the method of operating the powder bed fusion system includes controlling a pattern control system to form a pattern in the area scanning laser beam. The pattern is controlled to correspond to at least a portion of the interior of the closed shape.

In another aspect of the disclosure, the method of operating the powder bed fusion system includes deactivating the area laser beam generator to stop the area scanning laser beam. The area laser scanner optical device of the first active build chamber is moveable relative to the powder bed, so that the area laser scanner optical device may be positioned within the first active build chamber to direct the area scanning laser beam onto different regions of the powder bed in the first active build chamber. The area laser beam generator is then re-activated to generate the area scanning laser beam, and direct the area scanning laser beam onto the area laser scanner optical device of the first active build chamber. The area laser scanner optical device directs the area scanning laser beam onto the powder in the powder bed in the second region, to melt the powder within the exterior edge of the closed shape to fill in the interior of the closed shape and further define the first cross sectional layer of the product.

In another aspect of the disclosure, the method of operating the powder bed fusion system includes selecting another one of the plurality of individual build chambers as a second active build chamber. A powder is spread over a powder bed in the second active build chamber. A point laser scanner, which is dedicated to the second active build chamber, is activated to direct a point scanning laser beam onto the powder in the powder bed of the second active build chamber. The point scanning laser beam of the second active build chamber is moved relative to the powder bed of the second active build chamber to melt the powder in the powder bed along a path defining tan exterior edge of a closed shape of a product. The area beam delivery system is moved into a position adjacent the second active build chamber, such that the area beam delivery system is positioned to direct the area scanning laser beam to an area laser scanner optical device that is dedicated to the second active build chamber. The area laser beam generator is activated to generate the area scanning laser beam and direct the area scanning laser beam to the area beam delivery system. The area beam delivery system directs the area scanning laser beam to the area laser scanner optical device of the second active build chamber. The area laser scanner optical device of the second active build chamber directs the area scanning laser beam onto the powder in the powder bed of the second active build chamber to melt the powder within the exterior edge of the closed shape to fill in an interior of the closed shape and define a first cross sectional layer of the product.

Accordingly, the powder bed fusion system uses only a single area laser beam generator and a single area beam delivery system with multiple build chambers. The area beam delivery system is moved between the different build chambers, so that each build chamber does not require an individual area laser beam generator or an area beam delivery system. Each individual build chamber includes its own point laser scanner. The point laser scanner may be used to contour or define the edge of a closed shape, and the area laser scanner may be used to fill in the interior of the closed shape. It should be appreciated that the point laser scanner may also be used to fill in the interior of the closed shape, for example, if the area laser scanner is occupied at another one of the build chambers. The best efficiency may be obtained by directing the area laser scanner to the build chamber having the largest interior area that requires filling. This system optimizes the performance characteristics of the point laser scanner and the area laser scanner.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a powder bed fusion system is generally shown at 20. The powder bed fusion system 20 is used to employ an additive manufacturing process. In general, as known to those skilled in the art, the additive manufacturing process includes developing a three dimensional computer model of a product, and then slicing the three dimensional model into thin slices to define multiple cross sectional layers. A thin layer of a powdered material 34 is then applied to a build platform, and a laser beam is used to fuse the powdered material 34 at the location(s) the laser beam is applied. The location and/or path that the laser beam is applied is defined by each respective cross sectional layer of the three dimensional product. Another layer of the powdered material 34 is applied over the first, and the laser beam is used to fuse the second layer of powdered material 34 to the fused cross sectional layer beneath. The process is repeated for each cross sectional layer, thereby building up the three dimensional product. The powdered material 34 may include metals, alloys, plastics, composites, or some other material not described herein. The powder bed fusion system 20 may be used to manufacture any type and/or configuration of product that is manufactured from a material capable of being used in the additive manufacturing process, and is capable of being formed by the additive manufacturing process. The specific type, shape, and/or configuration of the product are not pertinent to the teachings of this disclosure, and are therefore not described in detail herein.

Figure 1:
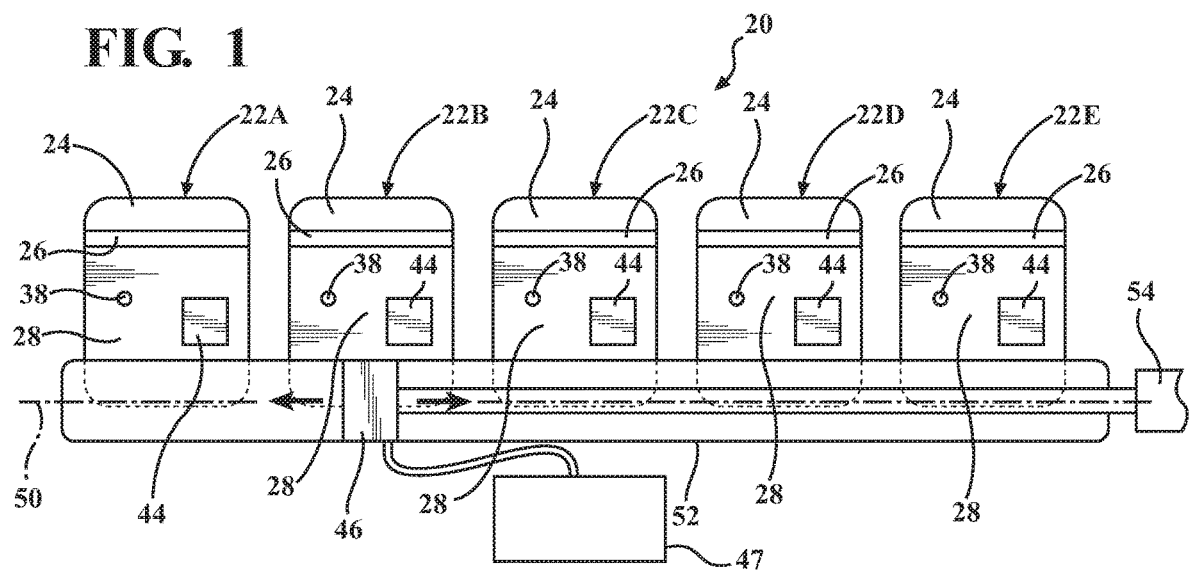
FIG. 1 is a schematic plan view of a first embodiment of a powder bed fusion system.
Figure 2:
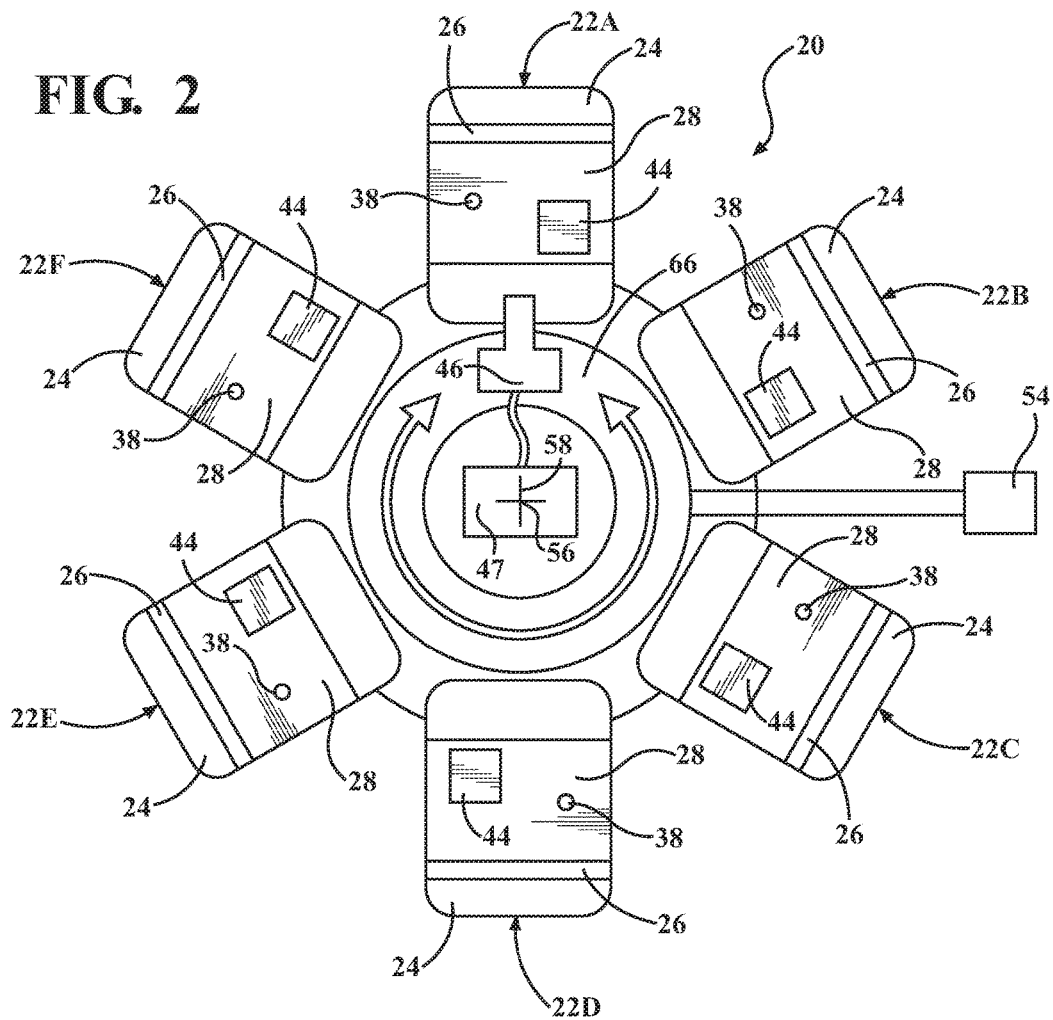
FIG. 2 is a schematic plan view of a second embodiment of the powder bed fusion system.

Referring to FIGS. 1 and 2, the powder bed fusion system 20 includes a plurality of individual build chambers 22. As shown in the Figures, the powder bed fusion system 20 includes a first build chamber 22A, a second build chamber 22B, a third build chamber 22C, a fourth build chamber 22D, and a fifth build chamber 22E. The powder bed fusion system 20 shown in FIG. 2 further includes a sixth build chamber 22F. The build chambers 22 are referred to generally herein by the reference numeral 22, and are referred to specifically herein and shown in the Figures by the respective reference numerals, i.e., 22A-22F. In some embodiments, the individual build chambers 22 may be configured identically to each other. In other embodiments, the individual build chambers 22 may be configured differently from each other. However, each of the individual build chambers 22 are equipped with the same general equipment for performing the same general process.

Figure 3:
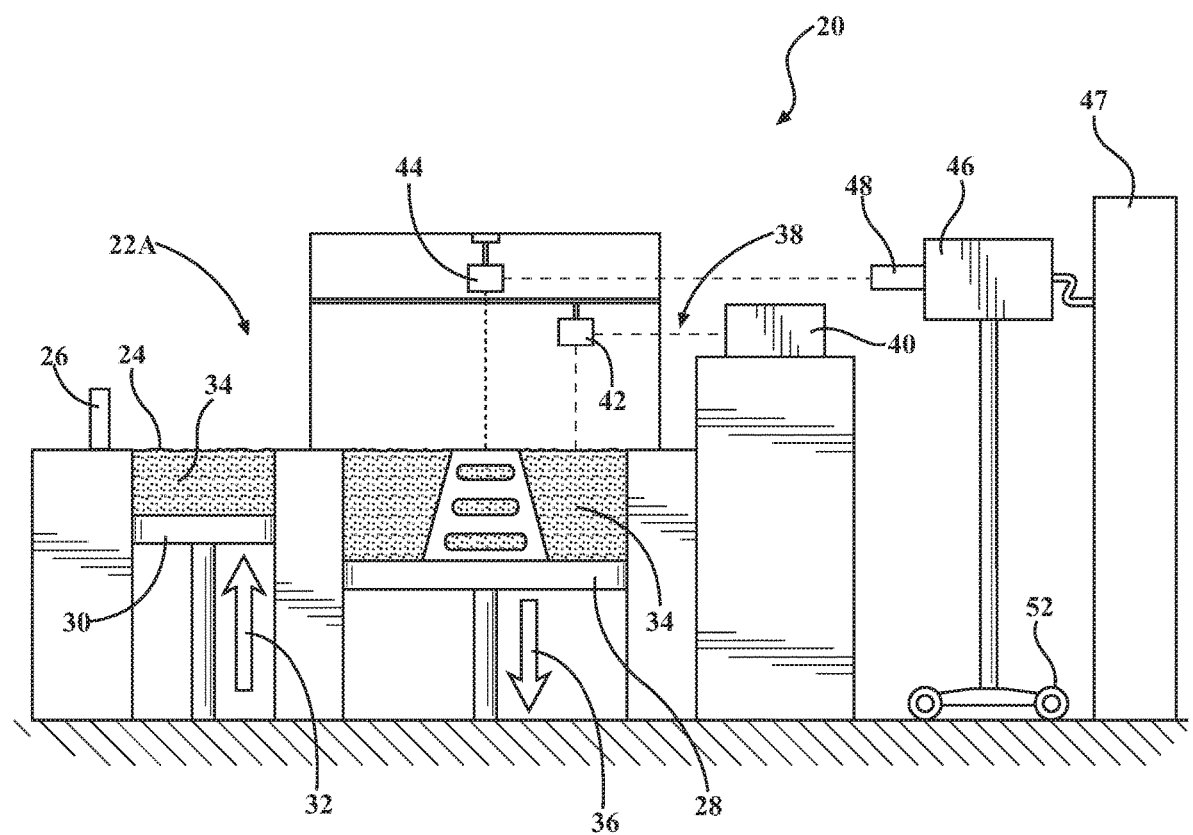
FIG. 3 is a schematic cross sectional view of a build chamber of the powder bed fusion system.

Referring to FIG. 3, each of the build chambers 22 includes a respective powder supply 24, a respective powder spreader 26, and a respective powder bed 28 or build platform. The powder supply 24, the powder spreader 26, and the build platform may be configured in any suitable manner. In the exemplary embodiment shown in FIG. 3, the powder supply 24 is contained in a chamber with a moveable floor 30. The floor 30 moves upward in a vertical direction, generally indicated by arrow 32, to present the powdered material 34 to the powder spreader 26 for each cross sectional layer to be applied. The powder spreader 26 may include a roller, a scraper, or some other similar device. The powder spreader 26 scrapes off a layer of the powdered material 34, and spreads is across the powder bed 28 in a thin layer. Once that layer of powdered material 34 is fused together, the powder bed 28 is lowered, generally indicated by arrow 36, the equivalent of one cross sectional thickness, and the floor 30 of the powder supply 24 is again raised to resupply the powder spreader 26 so that the process may be repeated. It should be appreciated that the individual build chambers 22 may differ in construction and operation from the exemplary embodiment shown and described herein and that the exemplary embodiment of the build chamber 22 shown in FIG. 3 and described herein is provided merely as an example of one possible embodiment of the build chambers 22.

Each of the build chambers 22 includes a respective point laser scanner 38. As such, the powder bed fusion system 20 includes a plurality of point laser scanners 38, with one of the point laser scanners 38 dedicated to only one of the individual build chambers 22. Each of the point laser scanners 38 includes a respective point laser generator 40, and a respective point laser optical device 42. The point laser scanners 38 operate as is known in the art. Generally, the point laser generator 40 is operable to generate a point scanning laser beam, and the point laser optical device 42 is operable to focus the point scanning laser beam on the powder bed 28 of its respective build chamber 22. The point laser optical device 42 is moveable within the build chamber 22 to move or direct the point scanning laser beam on the powder bed 28. Each of the point laser scanners 38 focuses their respective point scanning laser beam on a point area, hereinafter referred to as a second area. The second area covered by the point scanning laser beam has an area that is equal to or less than 0.8 mm$^2$. In some embodiments, the second area is equal to or less than 0.04 mm$^2$. The specific type, configuration and operation of the point laser scanners 38 are not pertinent to the teachings of this disclosure, and are therefore not described in detail herein.

Each of the individual build chambers 22 includes a respective area laser scanner optical device 44. Accordingly, the powder bed fusion system 20 includes a plurality of area laser scanner optical devices 44, with one of the plurality of area laser scanner optical devices 44 dedicated to only one of the plurality of build chambers 22. Each of the area laser scanner optical devices 44 cooperates with a single area beam delivery system 46 and a single area laser beam generator 47 to form an area laser scanner. The area laser scanner operates as is known in the art. In general, the area laser beam generator 47 is operable to generate an area scanning laser beam, and the respective area laser scanner optical devices 44 are operable to focus the area scanning laser beam on the powder bed 28 of its respective build chamber 22. The area beam delivery system 46 receives the area scanning laser beam from the area laser beam generator 47, and directs the area scanning laser beam to one of the area laser scanner optical devices 44 in one of the plurality build chambers 22. The area laser scanner optical devices 44 may be moveable within their respective build chamber 22 to move or direct the area scanning laser beam on the powder bed 28. Each of the area laser scanner optical devices 44 focuses their respective area scanning laser beam on an area, hereinafter referred to as a first area. The first area covered by the area scanning laser beam has an area that is equal to or larger than 4.0 mm$^2$. In some embodiments, the first area is equal to or larger than 25.0 mm$^2$. Accordingly, the point laser optical devices 42 focus their respective point scanning laser beam at a very small area, e.g., 0.04 mm$^2$ (approximately 100 microns), whereas the area laser scanner optical devices 44 focus their respective area scanning laser beam at a much larger area, e.g., at least 4.0 mm$^2$, or approximately 100 times larger than the point scanning laser beam.

As shown in FIGS. 1 and 2, the powder bed fusion system 20 includes only the single area beam delivery system 46 and the single area laser beam generator 47. As such, the area laser beam generator 47 and the area beam delivery system 46 are shared with the area laser scanner optical device 44 of each of the individual build chambers 22 to complete the area laser scanner. The area laser beam generator 47 produces the area scanning laser beam, which covers a much larger area than the point laser scanner 38. The area laser beam generator 47 may be stationary relative to the area beam delivery system 46, or may be moveable with the area beam delivery system 46. The area scanning laser beam may be directed to the area beam delivery system 46 through the air, via a fiber optic cable, or some other suitable transmission medium. In one embodiment, the area beam delivery system 46 directs the area scanning laser beam to the respective area laser scanner optical devices 44 through the air. In other embodiments, however, the area beam delivery system 46 may direct the area scanning laser beam to the respective area laser scanner optical devices 44 through a fiber optic cable or other suitable transmission medium.

The area beam delivery system 46 may include a pattern control system 48, which is operable to form a pattern in the area scanning laser beam on the powder bed 28. The pattern may include at least one heated area and at least one second temperature area. The at least one heated area may be heated to a first temperature, which is different than the second temperature area. The second temperature area may be heated to a second temperature, or may not be heated at all, i.e., the second temperature area may include an un-heated area. The pattern control system 48 may be used to form intricate patterns in the area scanning laser beam, which are applied over a large area of the powder bed 28. The area laser beam generator 47, the beam delivery system 46, the pattern control system 48, and the area laser scanner optical devices 44, may be configured in any suitable manner, and are known to those skilled in the art. The specific type, configuration and operation of the area laser beam generator 47, the area beam delivery system 46, the pattern control system 48, and the area laser scanner optical devices 44 are not pertinent to the teachings of this disclosure, and are therefore not described in detail herein.

The area beam delivery system 46 and the plurality of individual build chambers 22 are moveable relative to each other, such that the area beam delivery system 46 is operable to provide the area scanning laser beam to any of the area laser scanner optical devices 44 in any of the individual build chambers 22. The build chambers 22 and the area beam delivery system 46 may be arranged and connected in any suitable manner that allows the area beam delivery system 46 and/or the individual build chambers 22 to move relative to each other, so that the area laser scanner optical devices 44 of each individual build chamber 22 may be positioned to receive the area scanning laser beam from the beam delivery system 46. It should be appreciated that the area beam delivery system 46 may be moveable relative to the plurality of build chambers 22, that the plurality of build chambers 22 may be moveable relative to the area beam delivery system 46, or that both the area beam delivery system 46 and the build chambers 22 move relative to each other.

Referring to FIG. 1, a first exemplary embodiment of the powder bed fusion system 20 is shown. As shown in FIG. 1, the plurality of build chambers 22 are arranged in a linear array, with the area beam delivery system 46 and the linear array of the plurality of build chambers 22 moveable relative to each other along a linear path 50. More specifically, the area beam delivery system 46 is moveable relative to the linear array of the plurality of build chambers 22 along the linear path 50. The powder bed fusion system 20 may include a track system 52 or other similar structure that moveably supports the area beam delivery system 46. A drive system 54 may interconnect the track system 52 and the area beam delivery system 46. The drive system 54 is operable to move the area beam delivery system 46 along the linear path 50 relative to the track system 52. The drive system 54 may include one or more electric motors, hydraulics, pneumatics, all hosing, piping, supports, controls, etc., necessary to move the area beam delivery system 46 along the track system 52.

Referring to FIG. 2, a second exemplary embodiment of the powder bed fusion system 20 is shown. As shown in FIG. 2, the plurality of build chambers 22 are arranged in an annular array having an approximate center 56, with the area laser beam generator 47 disposed at the approximate center 56 of the annular array of the plurality of build chambers 22. The annular array of the plurality of build chambers 22 and the area beam delivery system 46 are rotatable relative to each other about an axis 58. The axis 58 is disposed at the approximate center 56 of the annular array. More specifically, the area beam delivery system 46 is rotatable about the axis 58 relative to the annular array of the plurality of build chambers 22. The powder bed fusion system 20 may include a turntable 60 supporting the area beam delivery system 46. A drive system 54 may be connected to the turntable 60. The drive system 54 is operable to rotate the turntable 60 about the axis 58 relative to the annular array of the plurality of build chambers 22. The drive system 54 may include one or more electric motors, hydraulics, pneumatics, all hosing, piping, supports, controls, etc., necessary to rotate the turntable 60 about the axis 58, relative to the individual build chambers 22.

A method of operating the powder bed fusion system 20 is also provided. The method optimizes the use of the point scanning laser and the area scanning laser. Because the point scanning laser directs the point scanning laser beam to a small area, i.e., the second are, it works well for defining sharp, crisp edges or lines. However, due to the small point area, i.e., the second area, the point scanning laser is very slow for filling in large areas. However, because the area scanning laser projects the area scanning laser beam onto a much larger area, the area scanning laser works well for quickly filling in areas. Accordingly, the method described below, uses the respective point scanning laser of each individual build chamber 22 for contouring or edging a part, and uses the single area laser beam generator 47 and the single area beam delivery system 46 in cooperation with the respective area laser scanner optical device 44 of each individual build chamber 22 for filling in the interiors of the part.

The method includes providing the powder bed fusion system 20. The powder bed fusion system 20 may be configured differently than shown in the Figures or described herein. However, it should be appreciated that the powder bed fusion system 20 includes the plurality of individual build chambers 22. Each of the individual build chambers 22 includes a respective point laser scanner 38. Each of the respective point laser scanners 38 focuses a respective point scanning laser beam at the second area, which is equal to or less than 0.8 mm$^2$. Each of the individual build chambers 22 further includes a respective area laser scanner optical device 44. Each of the respective area laser scanner optical devices 44 focuses the area scanning laser beam from the area beam delivery system 46 onto the first area, which is equal to or larger than 4.0 mm$^2$. The powder bed fusion system 20 provided further includes the single, area laser beam generator 47, and the single area beam delivery system 46. At least one of the area beam delivery system 46 and the plurality of individual build chambers 22 are configured to be moveable relative to the other other, such that the area beam delivery system 46 is operable to provide the area scanning laser beam to any of the plurality of area laser scanner optical devices 44 in any of the plurality of build chambers 22.

One of the individual build chambers 22 as selected as a first active build chamber. As used herein, the first active build chamber is defined as the first build chamber 22A. The powder spreader 26 spreads the powdered material 34 over the powder bed 28 in the first active build chamber 22A. The respective point laser scanner 38 dedicated to the first active build chamber 22A is then activated to direct the point scanning laser beam onto the powdered material 34 in the powder bed 28 of the first active build chamber 22A. The point scanning laser beam is moved relative to the powder bed 28 to melt the powder in the powder bed 28 along a path defining an exterior edge of a closed shape of a first product within the first active build chamber 22A. As such, the point scanning laser beam is used to edge or contour the exterior or outer edge of the first product.

The area beam delivery system 46 is moved into a position adjacent the first active build chamber 22A, such that the area beam delivery system 46 is positioned to direct the area scanning laser beam to the area laser scanner optical device 44 dedicated to the first active build chamber 22A. The area laser beam generator 47 is then activated to generate the area scanning laser beam, and direct the area scanning laser beam to the area beam delivery system 46. The area beam delivery system 46 then directs the area scanning laser beam to the area laser scanner optical device 44 of the first active build chamber 22A. The pattern control system 48 may be controlled to adjust or define a pattern in the area scanning laser beam projected onto the powder bed 28 of the first active build chamber 22A. The pattern may correspond to at least a portion of the interior of the closed shape defining the product. The area laser scanner optical device 44 directs the area scanning laser beam onto a first region of the powder in the powder bed 28, to melt the powder within the exterior edge of the closed shape to fill in an interior of the closed shape and at least partially define one cross sectional layer of the first product. The sequencing of the point scanning laser beam and the area scanning laser beam may vary. The point scanning laser may be used first to define the exterior edge of the closed shape, followed by the area scanning laser beam to fill in an interior of the closed shape. Alternatively, the area scanning laser may be used to fill in the interior of the closed shape first, followed by the point scanning laser to define the exterior edge of the closed shape.

The area laser beam generator may then be deactivated. If necessary, the area laser scanner optical device 44 of the first active build chamber 22A may be moved relative to the powder bed 28 into a second region, so that the area laser scanner optical device 44 is positioned to direct the area scanning laser beam onto a different region of the powder bed 28 of the first active build chamber 22A, i.e., the second region. Once the area laser scanner optical device 44 is repositioned, the area laser beam generator 47 is re-activated to generate the area scanning laser beam and direct the area scanning laser beam to the area laser scanner optical device 44 of the first active build chamber 22A. The area laser scanner optical device 44 may be repositioned as many times as necessary to fill in the closed shape of the first product. For example, the area laser scanner optical device 44 may be repositioned in a raster or grid configuration as needed.

Once the first cross sectional layer of the first product is formed, the area beam delivery system 46 may be moved to a different build chamber 22 while the first cross sectional layer of the first product cools. Alternatively, the area beam delivery system 46 may remain positioned adjacent the first active build chamber 22A to form a second cross sectional layer of the first product in the first active build chamber 22A. If the area beam delivery system 46 remains positioned adjacent the first active build chamber 22A, then the above describe process is repeated as necessary to completely form the first product.

The above described process may be repeated for each of the individual build chambers 22 in turn. For example, once the area beam delivery system 46 is finished with the first active build chamber 22A, while the first cross sectional layer of the first product cools or when the first product is complete, another one of the plurality of individual build chambers 22 is selected as a second active build chamber. As used herein, the second active build chamber is defined as the second build chamber 22B. Similar to the process described above, the powdered material 34 is spread over the respective powder bed 28 in the second active build chamber 22B, with the respective powder spreader 26 of the second active build chamber 22B. The respective point laser scanner 38 dedicated to the second active build chamber 22B is then activated to direct the point scanning laser beam onto the powdered material 34 in the powder bed 28 of the second active build chamber 22B. The point scanning laser beam is moved relative to the powder bed 28 to melt the powder in the powder bed 28 along a path defining an exterior edge of a closed shape of a second product within the second active build chamber 22B. As such, the point scanning laser beam in the second active build chamber 22B is used to edge or contour the exterior or outer edge of the second product.

The area beam delivery system 46 is moved into a position adjacent the second active build chamber 22B, such that the area beam delivery system 46 is positioned to direct the area scanning laser beam to the area laser scanner optical device 44 dedicated to the second active build chamber 22B. The area laser beam generator 47 is then activated to generate the area scanning laser beam, and direct the area scanning laser beam to the area beam delivery system 46. The area beam delivery system 46 then directs the area scanning alder beam to the area laser scanner optical device 44 of the second active build chamber 22B. The pattern control system 48 may be controlled to adjust or define a pattern in the area scanning laser beam projected onto the powder bed 28 of the second active build chamber 22B. The pattern may correspond to at least a portion of the interior of the closed shape defining the second product. The area laser scanner optical device 44 directs the area scanning laser beam onto a second region of the powder in the powder bed 28, to melt the powder within the exterior edge of the closed shape to fill in an interior of the closed shape and at least partially define one cross sectional layer of the second product. The above describe process is repeated as necessary to completely form the second product.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A powder bed fusion system comprising:
   a plurality of individual build chambers;
   a first energy source including a single area laser beam generator operable to generate an area scanning laser beam;
   a first set of laser directing optics respectively adapted to receive and direct the area scanning laser beam towards the plurality of build chambers, the first set of laser directing optics being operatively connected respectively to each of the plurality of build chambers;

a laser beam deliverer configured to receive the area scanning laser beam from the area laser beam generator and direct the area scanning laser beam to one of the first set of laser directing optics at a time;

a second energy source including a plurality of point laser generators configured to generate a respective point laser beam dedicated to a respective one of the plurality of build chambers;

a second set of laser directing optics respectively adapted to receive and direct the respective point laser beams to the plurality of individual build chambers, the second set of laser directing optics being operatively connected to each of the plurality of individual build chambers; and wherein the laser beam deliverer and the plurality of individual build chambers are moveable relative to each other, such that the laser beam deliverer is operable to direct the area scanning laser beam to any of the first set of laser directing optics in any of the plurality of build chambers.

2. The powder bed fusion system set forth in claim 1, wherein the plurality of build chambers are arranged in a linear array, with the laser beam deliverer and the linear array of the plurality of build chambers moveable relative to each other along a linear path.

3. The powder bed fusion system set forth in claim 2, wherein the laser beam deliverer is moveable relative to the linear array of the plurality of build chambers.

4. The powder bed fusion system set forth in claim 3, further comprising a track system moveably supporting the laser beam deliverer.

5. The powder bed fusion system set forth in claim 4, further comprising a drive system interconnecting the track system and laser beam deliverer, wherein the drive system is operable to move the deliverer along the linear path relative to the track system.

6. The powder bed fusion system set forth in claim 1, wherein the plurality of build chambers are arranged in an annular array having an approximate center, with the area laser beam generator disposed at the approximate center of the annular array of the plurality of build chambers, and with the annular array of the plurality of build chambers and the laser beam deliverer rotatable relative to each other about an axis.

7. The powder bed fusion system set forth in claim 6, wherein the laser beam deliverer is rotatable about the axis relative to the annular array of the plurality of build chambers.

8. The powder bed fusion system set forth in claim 7, further comprising a turntable supporting the deliverer.

9. The powder bed fusion system set forth in claim 8, further comprising a drive system connected to the turntable, wherein the drive system is operable to rotate the turntable about the axis relative to the annular array of the plurality of build chambers.

10. The powder bed fusion system set forth in claim 1, wherein each of the first set of laser directing optics is configured to respectively focus the area scanning laser beam onto a first area equal to or larger than 4.0 $mm^2$.

11. The powder bed fusion system set forth in claim 1, wherein the area scanning laser beam is focused onto at least one heated area that is heated to a first temperature, and at least one second temperature area having a second temperature that is different from the first temperature.

12. The powder bed fusion system set forth in claim 1, wherein the second set of laser directing optics are configured to focus the respective point laser beams on a second area equal to or less than 0.8 $mm^2$.

13. The powder bed fusion system set forth in claim 1, wherein each of the plurality of build chambers includes a respective powder supply, a respective powder spreader, and a respective powder bed.

14. The powder bed fusion system set forth in claim 1, wherein:
each of the first set of laser directing optics respectively focuses the area scanning laser beam onto a first area; and
each of the second set of laser directing optics focuses the respective point laser beams onto a second area, the second area being small relative to the first area.

15. The powder bed fusion system set forth in claim 14, wherein:
the first area is equal to or larger than 4.0 $mm^2$ and the second area is equal to or less than 0.8 $mm^2$.

16. The powder bed fusion system set forth in claim 14, wherein:
the first area is about 100 times larger than the second area.

17. The powder bed fusion system set forth in claim 14, wherein:
each of the plurality of build chambers includes a respective powder bed having a respective powder;
wherein the respective point laser beams are configured to move relative to the respective powder bed to melt the respective powder along a path defining an exterior edge of a closed shape of a product; and
wherein the area scanning laser beam is configured to melt the respective powder within the exterior edge of the closed shape to fill in an interior of the closed shape of the product.

18. A powder bed fusion system comprising:
a plurality of individual build chambers;
a first energy source including a single area laser beam generator operable to generate an area scanning laser beam;
a first set of laser directing optics respectively adapted to receive and direct the area scanning laser beam towards the plurality of build chambers, the first set of laser directing optics being operatively connected respectively to each of the plurality of build chambers;
a laser beam deliverer configured to receive the area scanning laser beam from the area laser beam generator and direct the area scanning laser beam to one of the first set of laser directing optics at a time;
a second energy source including a plurality of point laser generators configured to generate a respective point laser beam dedicated to a respective one of the plurality of build chambers;
a second set of laser directing optics respectively adapted to receive and direct the respective point laser beams to the plurality of individual build chambers, the second set of laser directing optics being operatively connected to each of the plurality of individual build chambers;
wherein the laser beam deliverer and the plurality of individual build chambers are moveable relative to each other, such that the laser beam deliverer is operable to direct the area scanning laser beam to any of the first set of laser directing optics in any of the plurality of build chambers;
wherein each of the plurality of build chambers includes a respective powder bed having a respective powder;
wherein the respective point laser beams are configured to move relative to the respective powder bed to melt the respective powder along a path defining an exterior edge of a closed shape of a product; and wherein the area scanning laser beam is configured to melt the respective powder within the exterior edge of the closed shape to fill in an interior of the closed shape of the product.

\* \* \* \* \*